May 26, 1959  J. A. EINHIPLE  2,888,050
VERTICAL MULTIPLE DRILL

Filed Nov. 13, 1956  2 Sheets-Sheet 1

INVENTOR.
John A. Einhiple
BY
Robert F. Hause
ATTORNEY

May 26, 1959  J. A. EINHIPLE  2,888,050
VERTICAL MULTIPLE DRILL

Filed Nov. 13, 1956  2 Sheets-Sheet 2

INVENTOR.
John A. Einhiple
BY
ATTORNEY

United States Patent Office 2,888,050
Patented May 26, 1959

2,888,050

VERTICAL MULTIPLE DRILL

John A. Einhiple, Kenmore, N.Y., assignor to National Gypsum Company, Buffalo, N.Y., a corporation of Delaware Application November 13, 1956, Serial No. 621,585

4 Claims. (Cl. 144—110)

This invention relates to a rapid loading and unloading drill chuck and more particularly to a vertical multiple drill machine having a plurality of chucks with means for rapid loading and unloading of drills therein.

Multiple drilling machines, as used for drilling the well known acoustical ceiling tile having approximately 500 holes of 3/16" diameter disposed throughout the face of the tile on 1/2" spaced centers, are obviously limited by space in the construction of the plurality of chucks. The need for means for rapidly changing drills, maintaining sharpened drills, will also be apparent, considering the large number of drills to be changed.

Vertical multiple drilling machines, incorporating the above described compactness of size, heretofore required the individual removal as well as the individual insertion of each drill, and were ordinarily of the type wherein drills are individually screwed into and out of the plurality of drill chucks, creating considerable lost time and labor.

It is an object of this invention to provide a novel compact multiple drill chuck capable of automatic locking on insertion of drills and instantaneous simultaneous release of the numerous drills from a large plurality of such chucks, all with relative ease and facility of operation.

These and other objects and advantages will appear more fully when considered in connection with the following detailed description of a preferred embodiment of the invention and the accompanying drawings in which.

Figure 1:
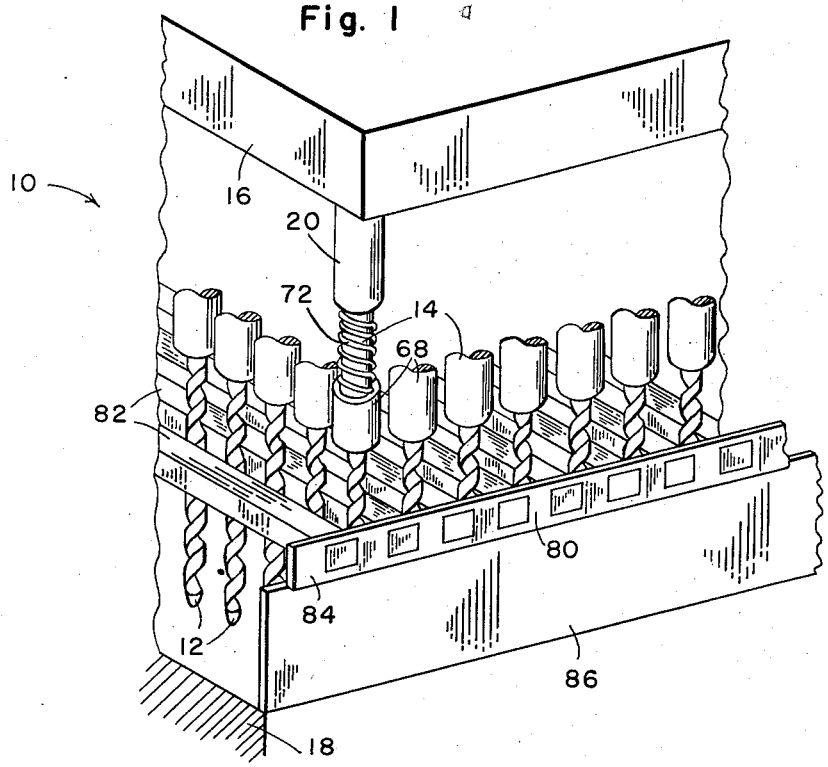
Fig. 1 is an isometric view of a portion of a multiple vertical drilling machine constructed in accordance with the invention and showing the drill releasing mechanism generally in position to be raised for releasing the plurality of drills.
Figure 2:
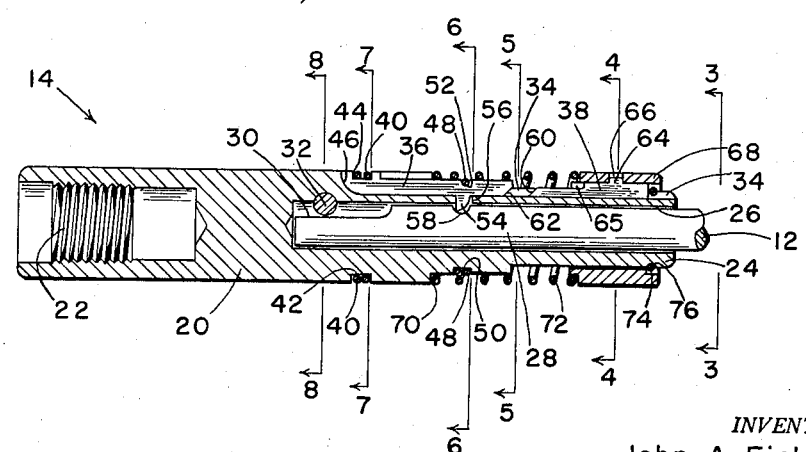
Fig. 2 is a sectional view of one of the chucks of the machine of Fig. 1.
Figure 3:
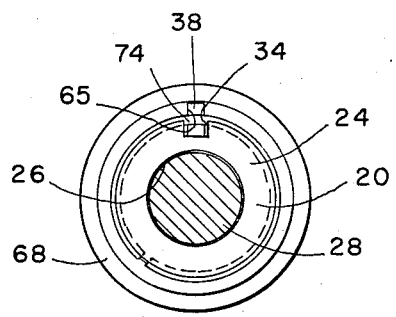
Fig. 3 is a sectional view of the chuck of Fig. 2 taken on line 3—3.
Figure 4:
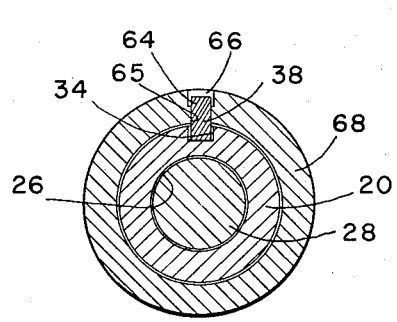
Fig. 4 is a sectional view taken on line 4—4.
Figure 5:
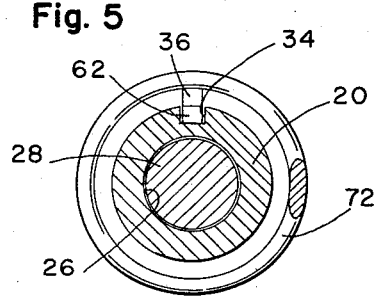
Fig. 5 is a sectional view taken on line 5—5.
Figure 6:
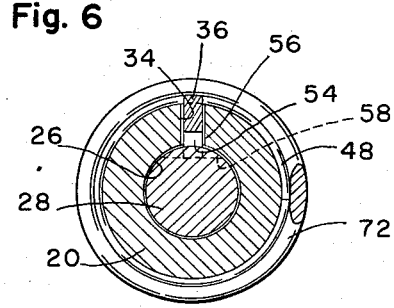
Fig. 6 is a sectional view taken on line 6—6.
Figure 7:
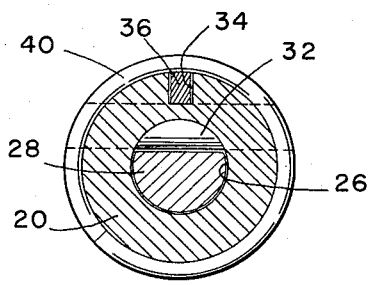
Fig. 7 is a sectional view taken on line 7—7.
Figure 8:
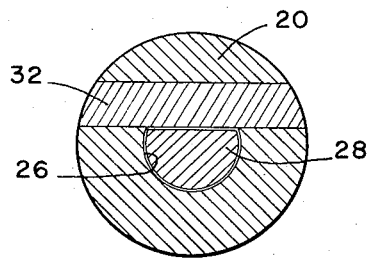
Fig. 8 is a sectional view taken on line 8—8.

Referring now to Fig. 1, there is shown a portion of a vertical drilling machine 10 which may have in the order of five hundred drills 12 rotatably mounted and driven, extending downwardly, for drilling, in the present embodiment, 3/16" holes, horizontally spaced in perpendicular directions on 1/2" centers.

Drills 12 are each mounted in individual, rotatably-mounted chucks 14, which are limited in diametric size to less than the drill center-to-center spacing, the present embodiment incorporating the common 1/2" spacing. Chucks 14 are shown mounted and extending downward from a fixed, drilling-machine-head 16, containing suitable, known means for simultaneously rotating the large plurality of chucks 14. Disposed below fixed head 16 is a vertically-movable, machine work-bed 18, on which acoustical ceiling tiles or other material may be placed and raised therewith to be drilled with the multiple drills 12.

Referring now to Figs. 2 to 8, chucks 14 will be seen to include a generally cylindrical chuck-body 20. Chuck-body 20 is hollow and coaxially-internally-threaded at one end 22 thereof to provide means for mounting upon one of the plurality of complementarily threaded drive-shafts of the standard, vertical, drilling-machine-head 16.

The opposite, drill-receiving end 24 of body 20 is also coaxially drilled hollow inwardly a substantial distance to provide a drill-receiving-bore 26. The shank 28 of a drill 12 is shown inserted in bore 26 in Fig. 2. The end of shank 28 has a milled-flat-side 30 which engages a short rod 32 which is press fit into body 20 perpendicular and off center of bore 26, whereby rotation of drill 12 relative to chuck 14 is prevented.

A narrow, axial slot 34 extends along the outer periphery of body 20 from end 24 substantially the length of bore 26, and in the embodiment shown is on the same side of body 20 as the rod 32, although such a relative position is not essential. Disposed in slot 34 is a flat, drill-locking-piece 36 and a flat, lock-lifting-piece 38, both pieces 36 and 38 being loosely fit in slot 34.

Drill-locking-piece 36 is pivotally held at its inner end by a double spiral, retaining-ring 40 which has been tightly snapped in place and is disposed in a circumferential groove 42 extending around body 20 and in an aligned notch 44 in the inner end of piece 36. Slot 34 and piece 36 are complementarily curved at their respective innermost ends 46 to permit pivoting of piece 36 about retainer-ring 40. The outer end of piece 36 is urged radially inwardly by a circular wire spring 48 which has been tightly snapped in place and is disposed in a circumferential groove 50 around body 20 and in an aligned notch 52 in the outer end of piece 36. Piece 36 further includes a radially inwardly extending tongue 54 which extends through a hole 56 in the body 20 at the bottom of slot 34. Tongue 54 extends into bore 26 engaging a groove 58 in the shank 28 of drill 12, restraining or preventing the removal of drill 12 from body 20.

Lock-lifting-piece 38, disposed also in slot 34 but axially outward of piece 36, includes essentially an acutely-angled inner-end 60 which when slid inward in slot 34 engages a complementarily-acutely-angled outer-end 62 of piece 36, whereby the outer-end 62 of piece 36 is lifted radially outward, disengaging tongue 54 from groove 58 of the drill 12. Lock-lifting-piece 38 has a radially-outwardly-directed lip 64 which is press-fit into an axial-slot 65 and a radially-outer hole 66 in a cylindrical-sleeve 68 slidably mounted about the periphery of body 20.

Body 20 has a peripheral shoulder 70 facing the outer-end 24 and spaced substantially inward of the innermost travel of sleeve 68. A coil-spring 72, of a diameter which is complementary to shoulder 70 and sleeve 68, is disposed therebetween urging sleeve 68 axially outward. A retaining-ring 74, which has been tightly snapped in place, is disposed in a circumferential groove 76 extending around body 20 adjacent end 24 limiting the outward movement of sleeve 68 caused by spring 72.

Referring again to Fig. 1, means are shown for rapid simultaneous disengagement of all drills, wherein a unitary unlocking rack 80 of a plurality of parallel, long-length metal bars 82 mounted to extend from a single end-strip 84 are disposed with bars 82 extending between each row of drills 12, and resting at each end on an upright plate 86 mounted on drilling-machine work-bed 18. Bars 82 are disposed sufficiently above bed 18 and are of such width that by raising bed 18, the bars 82 each engage the end faces of the sleeves 68 of each chuck of the two rows to each side thereof, whereby upon further raising of bed 18, plate 86, rack 80 and the sleeves 68 of all chucks are simultaneously raised causing lock-lifting-pieces 38 to slide in slots 34, engaging and radially pivoting and lifting drill-locking-pieces 36. Tongues 54 thus simultaneously disengage grooves 58 of all drills 12 and all drills drop from chucks 14 onto the bed 18.

By lowering bed 18 and thus bars 82, sleeves 68 on each chuck are free to return against retaining-rings 74 and are so urged by springs 72. With lock-lifting-piece 38 moving with sleeve 68, drill locking piece 36 is free to pivot radially inward and is so urged by spring 48. Tongue 54, extending into bore 26, is resiliently held by spring 48. The axially-outer, radially-inner face of tongue 54 is tapered allowing a resharpened drill 12 to be hand, or otherwise, inserted into bore 26, lifting tongue 54 sufficiently to be completely inserted, whereupon tongue 54 is urged into groove 58 of drill 12 by spring 48, automatically locking drill 12 in working position.

It will be understood that spring 48, which is provided to normally urge drill-locking-piece 36 radially inward, is constructed with sufficient resilience to spread and expand in diameter, when during unloading, a reasonable force is applied to raise lock-lifting-piece 38 into engagement with drill-locking piece 36, to permit complete disengagement of tongue 54 from groove 58, or when, during loading a reasonable force is applied to insert a resharpened drill 12 into bore 26, to completely engage the groove 58 with the tongue 54. The coil spring 72, provided to urge sleeve 68 to a normal outward position, is, in the preferred embodiment as shown, of sufficiently small diameter that, during high speed revolving with consequent centrifugal forces during drilling, it supplements spring 48 in the retention of drill-locking-piece 36 in a normal radially inward position, but of sufficiently large diameter and of sufficient resilience to shift in position and kink slightly in shape when, during unloading, a reasonable force is applied to raise lock-lifting-piece 38 into engagement with drill-locking-piece 36, to permit complete disengagement of tongue 54 from groove 58, or when, during loading, a reasonable force is applied to insert a resharpened drill 12 into bore 26, to completely engage the groove 58 with tongue 54.

Chuck 14 thus provides in a most compact structure means for easily and simultaneously removing a large number of drills in a vertical multiple drill head, which means are susceptible also of very fast and easy reinsertion of drills, and properly holding the drills during subsequent repeated drilling operations. Such a compact structure has been found highly successful with over-all chuck diameters as small as 7/16 inch.

Having completed a detailed disclosure of the preferred embodiment of my invention so that those skilled in the art may practice the same, I contemplate that variations may be made without departing from the scope of the invention as defined in the appended claims.

I claim:

1. A highly compact, automatic load and unload, drill chuck for vertical multiple drill machines, said chuck comprising a hollow cylindrical body portion with an axial bore for the reception of a drill shank, an axially extending groove on the outside wall of said body portion, an elongate locking-piece disposed in said groove with one end substantially restrained whereby the opposite end may be pivoted radially outward thereabout, said locking-piece having a drill-locking-tongue extending radially inward through an appropriate hole in said chuck body and extending into the said bore for locking engagement with a grooved drill-shank when disposed therein, a lock-lifting-piece disposed in said groove closely adjacent said locking-piece, said locking-piece and said lifting-piece having complementarily shaped adjacent ends whereby movement of said lifting-piece into engagement with said locking-piece pivots said locking piece about its said restrained end and lifts said tongue radially outward from within said bore, said chuck further including means for normally urging said tongue into said bore and means for preventing rotation of a drill shank relative to said chuck when said drill shank is disposed in said bore.

2. A drill chuck as defined in claim 1 wherein said lifting-piece is affixed to a cylindrical sleeve slidably mounted on said body for facility in the sliding unlocking operation of said lifting-piece.

3. A drill chuck as defined in claim 2 further including spring means for normally urging said sleeve away from said locking-piece, and retaining means for preventing said sleeve from excessive movement away from said locking-piece.

4. In combination, a vertical multiple drill machine having a plurality of chucks as defined in claim 3, and a unitary unlocking rack, said rack comprising a plurality of elongate bars of a size and spacing whereby they may be disposed between rows of said chucks and upon raising said rack said bars engage and depress the said chuck sleeves and simultaneously release all drills from said chucks.

References Cited in the file of this patent

UNITED STATES PATENTS

| | | |
|---|---|---|
| 1,331,806 | Curtis | Feb. 24, 1920 |
| 1,963,462 | Brock | June 19, 1934 |
| 2,234,789 | Wunderlich | Mar. 11, 1941 |
| 2,596,594 | Petre | May 13, 1952 |